UNITED STATES PATENT OFFICE.

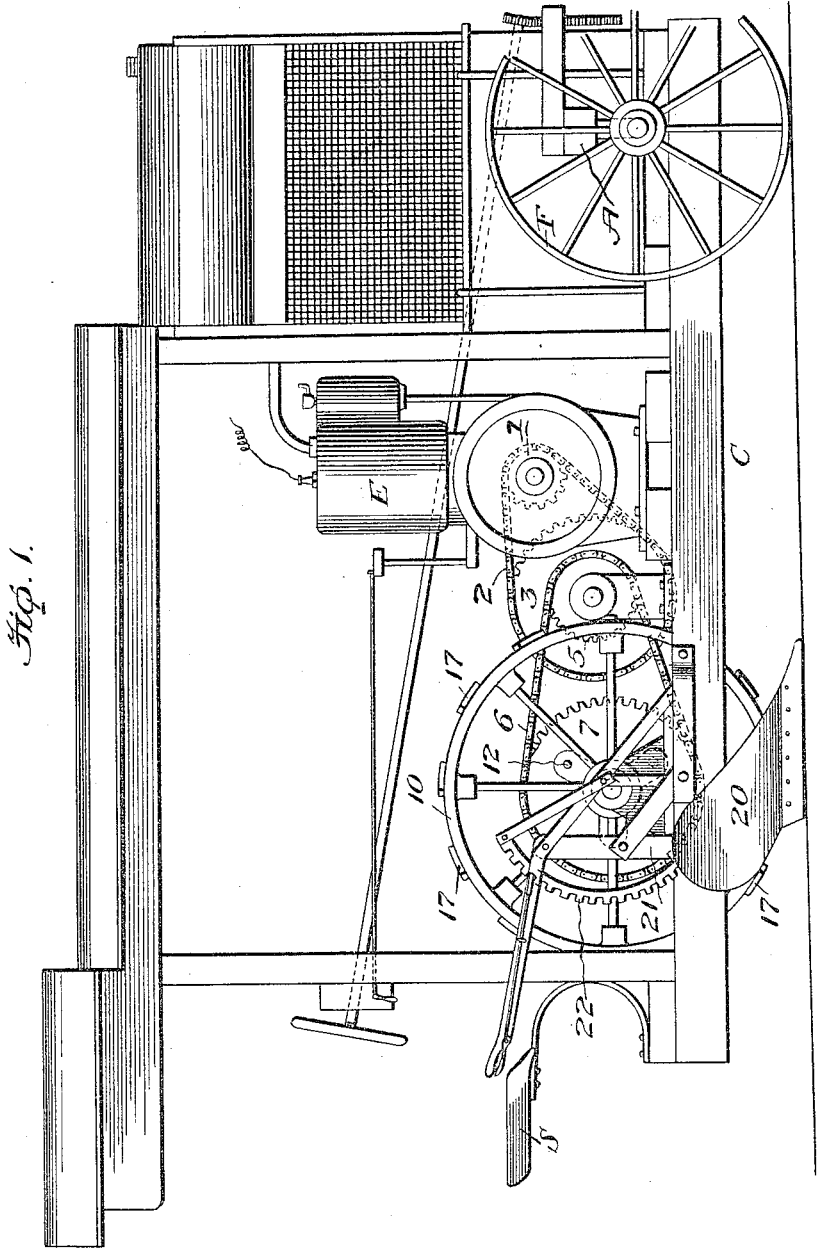

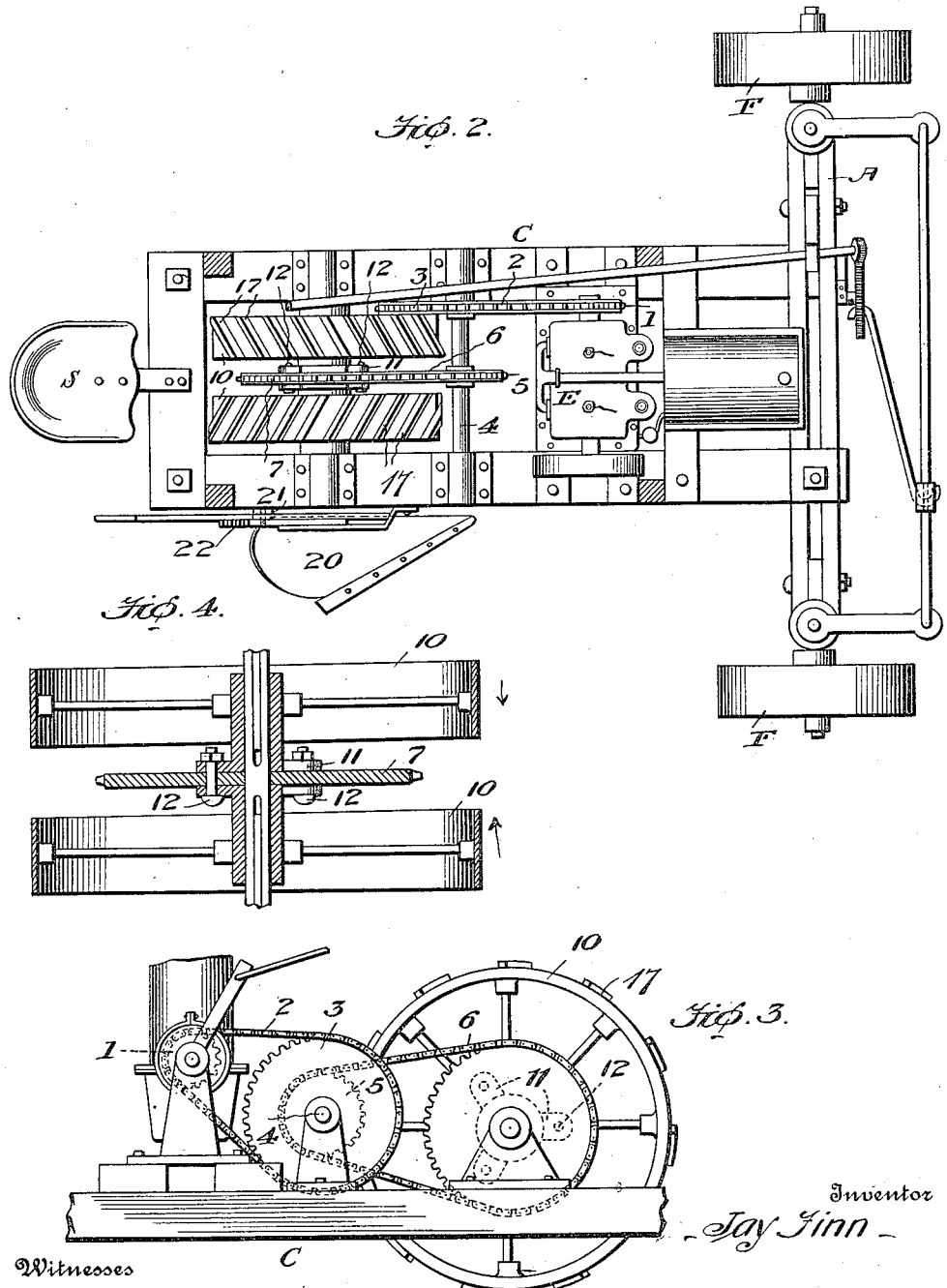

JAY FINN, OF ELMO, KANSAS.

TRACTOR FOR PLOWS, &c.

1,211,565.

Specification of Letters Patent.

Patented Jan. 9, 1917.

Application filed October 16, 1913. Serial No. 795,598.

*To all whom it may concern:*

Be it known that I, JAY FINN, a citizen of the United States, residing at Elmo, in the county of Dickinson and State of Kansas, have invented certain new and useful Improvements in Tractors for Plows, &c.; and I do declare the following to be a full, clear, and exact description of the invention, such as will enable others skilled in the art to which it appertains to make and use the same.

This invention relates to motor vehicles, and more especially to the driving wheels therefor.

The object of the invention is to produce a main driving wheel disposed inside the framework or chassis, whereas the plow is mounted outside the same, so that the main wheels travel on the land side of the furrow as shown. These and other objects are carried out by constructing the machine in the manner hereinafter more fully set forth and as shown in the drawings wherein—

Figure 1 is a side elevation of this machine complete. Fig. 2 is a plan view thereof with the canopy removed. Fig. 3 is a side elevation of the driving mechanism showing the connection between the engine and the main wheel. Fig. 4 is an enlarged horizontal section through the two parts of the main wheel and the driven gear between them.

The tractor of this machine comprises a rectangular frame or chassis C having a comparatively long axle A across its front end, to whose extremities are pivoted the front wheels F controlled by steering mechanism led back to a hand wheel standing just in front of the driver's seat S which rises from the rear end of the frame C. The type of engine E employed is unimportant, and the controls for the same will lead also back to within reach of the operator. I prefer, however, to dispose the main shaft of the engine transverse of the frame C and mount a sprocket wheel 1 on this shaft which is connected by a chain belt 2 with a large sprocket wheel 3 on an idle shaft 4. This shaft carries a small sprocket wheel 5 connected by a chain belt 6 with a driven sprocket wheel 7 which stands between and is fixed to the two parts of the main driving wheel of the tractor. Said wheel comprises parts 10, 10, as shown, and each part carries on the inner end of its hub a spider 11 comprising three ears which are bolted as at 12 to the driven sprocket wheel—thereby uniting the two parts into one large main wheel having a sprocket wheel in its center by means of which it is driven. By so constructing this drive wheel, either of the two halves or the sprocket wheel between the same may be easily removed for the purpose of making repairs, or for substituting a heavier sprocket wheel, in case the tractor is employed for heavy work. Furthermore the two halves of the drive wheel are adapted to be adjustable to different widths or thicknesses of sprocket wheels inserted between them. This is clearly shown in Fig. 3 of the drawings. This large wheel may be mounted fast on its shaft and the latter disposed in bearings on the frame, or the frame may carry a cross axle and the wheel be mounted in bearings thereon; but it will be observed from the drawings that the driving wheel is in two parts, both having obliquely disposed ribs 17 on their peripheries, which extend forwardly, that is, in the direction of rotation of the wheel, from the outer remote edges of the two parts of said wheel to the inner adjacent edges thereof. By so doing, as power is transmitted to the wheel, the oblique ribs engaging the earth tend to force the two parts of the wheel toward each other to frictionally clamp the sprocket 7 between the spiders 11, thus relieving the bolts 12 of unnecessary strain.

The plow 20 is secured to the lower end of the standard 21 which is mounted for vertical movement on the outside of the frame C directly opposite the axle of the main wheel, and a hand lever and toothed sector 22 is provided for adjusting the position of this standard so as to raise and lower the plow. It will be observed that the plow is outside of the chassis frame, but the hand lever is within reach of the operator sitting on the seat S. The only other things outside the chassis frame are the two front wheels F, one of which travels on the land side and the other on the smooth ground, while the two main wheels travel on the plowed ground alongside the furrow being made. Therefore the only vibration imparted to this machine is that communicated to the front wheel which travels on the plowed land, and the length of the front axle A is such that this vibration is taken up to a great extent by the frame of the machine and therefore not communicated to a great extent to the plow. Moreover, the weight of the main wheels and of the driver are employed to hold the plow down into the ground so as to resist vibration as far as possible.

The details of construction of the plow are unimportant—in fact, the plow may be raised or removed and some other machinery hitched to this tractor and drawn over the ground, or some other form of implement may be attached to the standard in place of the plow. I find by experiment that a two-part driving wheel can be used, even on rather soft ground, if the parts stand side by side and as close together as possible; whereas, if the driving wheels are far apart, one or both of them must be provided with backing ratchets in order to enable the machine to turn corners.

I do not wish to be limited with respect to details, and the proportions and materials of parts are unessential.

What is claimed as new is:

In a traction device, the combination of an axle, a driving wheel surrounding the same, a pair of spaced traction wheels disposed one on each side of the driving wheel and having elongated hubs mounted on the axle with their inner ends disposed in contact with the opposite sides of said driving wheel, a plurality of radiating ears formed integrally with the inner ends of the hubs and contacting with opposite sides of the driving wheel whereby to brace and reinforce said wheel, and bolts passing through said ears and through the intervening driving wheel.

In testimony whereof I have hereunto set my hand in presence of two subscribing witnesses.

JAY FINN.

Witnesses:
JOHN DONNELLY,
JAS. P. FINN.

Copies of this patent may be obtained for five cents each, by addressing the "Commissioner of Patents, Washington, D. C."